US011969824B2

(12) United States Patent
Ida et al.

(10) Patent No.: US 11,969,824 B2
(45) Date of Patent: Apr. 30, 2024

(54) METHOD OF ADJUSTING LASER PROCESSING APPARATUS

(71) Applicant: DISCO CORPORATION, Tokyo (JP)

(72) Inventors: Kazuhiko Ida, Tokyo (JP); Tetsuya Mizutani, Tokyo (JP); Junya Mimura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 72 days.

(21) Appl. No.: 17/095,025

(22) Filed: Nov. 11, 2020

(65) Prior Publication Data

US 2021/0162536 A1 Jun. 3, 2021

(30) Foreign Application Priority Data

Dec. 3, 2019 (JP) .................................. 2019-218825

(51) Int. Cl.
*B23K 26/08* (2014.01)
*B23K 26/0622* (2014.01)
*B23K 26/06* (2014.01)
*B23K 26/082* (2014.01)

(52) U.S. Cl.
CPC ...... *B23K 26/0853* (2013.01); *B23K 26/0622* (2015.10); *B23K 26/0648* (2013.01); *B23K 26/082* (2015.10); *B23K 26/0643* (2013.01)

(58) Field of Classification Search
USPC ............. 219/121.82, 121.83, 121.78, 121.79
See application file for complete search history.

(56) References Cited

U.S. PATENT DOCUMENTS

| 2010/0039680 A1* | 2/2010 | Yoon ..................... B23K 26/082 358/474 |
| 2017/0040235 A1* | 2/2017 | Kobayashi .............. H01L 22/30 |
| 2017/0323774 A1* | 11/2017 | Kirihara .................. H01L 21/78 |
| 2018/0128686 A1* | 5/2018 | Wakabayashi ....... B23K 26/354 |
| 2021/0023652 A1* | 1/2021 | Yamanashi .......... B23K 26/035 |

FOREIGN PATENT DOCUMENTS

| DE | 212018000067 U1 * | 4/2019 | .......... B23K 26/032 |
| JP | 2000098271 A * | 4/2000 | |
| JP | 2008264805 A * | 11/2008 | |
| JP | 2008264805 A | 11/2008 | |
| WO | WO-2017220030 A1 * | 12/2017 | ............... G06T 7/00 |

* cited by examiner

*Primary Examiner* — Elizabeth M Kerr
(74) *Attorney, Agent, or Firm* — Greer Burns & Crain Ltd.

(57) ABSTRACT

A method of adjusting a laser processing apparatus includes controlling an X-axis galvanometer scanner and a Y-axis galvanometer scanner on the basis of X coordinates and Y coordinates recorded in a coordinate recording section to apply a pulsed laser beam to a workpiece, thereby processing the workpiece, actuating an X-axis moving mechanism and a Y-axis moving mechanism on the basis of the X coordinates and the Y coordinates recorded in the coordinate recording section and causing an image capturing unit to capture an image of processed marks on the workpiece, and detecting shifts between X coordinates and Y coordinates of the processed marks whose image has been captured in the processed mark image capturing step and the X coordinates and the Y coordinates recorded in the coordinate recording section, and recording corrective values in a corrective value recording section.

4 Claims, 5 Drawing Sheets

| $\alpha_1,$ | $\beta_1$ | | $\alpha_{51},$ | $\beta_{51}$ |
|---|---|---|---|---|
| $\alpha_{52},$ | $\beta_{52}$ | | $\alpha_{102},$ | $\beta_{102}$ |
| $\alpha_{103},$ | $\beta_{103}$ | | $\alpha_{153},$ | $\beta_{153}$ |
| $\alpha_{2449},$ | $\beta_{2449}$ | | $\alpha_{2499},$ | $\beta_{2499}$ |
| $\alpha_{2500},$ | $\beta_{2500}$ | | $\alpha_{2550},$ | $\beta_{2550}$ |
| $\alpha_{2551},$ | $\beta_{2551}$ | | $\alpha_{2601},$ | $\beta_{2601}$ |

METHOD OF ADJUSTING LASER PROCESSING APPARATUS

BACKGROUND OF THE INVENTION

Field of the Invention

The present invention relates to a method of adjusting the position where a pulsed laser beam is applied to a workpiece in a laser processing apparatus.

Description of the Related Art

Wafers having a plurality of devices such as integrated circuits (ICs) and large scale integration (LSI) circuits formed in respective areas on a face side that are demarcated by a plurality of projected dicing lines are divided into individual device chips by a laser processing apparatus, and the divided device chips will be used in electric appliances such as mobile phones and personal computers.

The laser processing apparatus includes a chuck table having a flat surface in an XY plane as a holding surface for holding a workpiece, i.e., a wafer, thereon, a laser beam applying unit for applying a pulsed laser beam to the workpiece held on the chuck table, an image capturing unit for capturing an image of the workpiece held on the chuck table, an X-axis moving mechanism for moving the chuck table and the image capturing unit relatively to each other in X-axis direction, a Y-axis moving mechanism for moving the chuck table and the image capturing unit relatively to each other in Y-axis direction perpendicular to the X-axis direction, and a control unit. The laser processing apparatus is able to process the wafer to a nicety.

A laser processing apparatus that processes a workpiece by dispersing and applying a laser beam to a plurality of locations on the workpiece includes a laser oscillator for oscillating pulsed laser, an X-axis galvanometer scanner for swinging a pulsed laser beam emitted from the laser oscillator in X-axis direction, a Y-axis galvanometer scanner for swinging the pulsed laser beam emitted from the laser oscillator in Y-axis direction, and an fθ lens for converging the pulsed laser beam that has been swung in the X-axis direction and the Y-axis direction onto the workpiece held on the chuck table (see, for example, JP 2008-264805A). The laser processing apparatus may be used to apply the pulsed laser beam to a plurality of electrodes on the devices on a wafer to form through holes in the electrodes.

SUMMARY OF THE INVENTION

However, the fθ lens is defective in that the laser beam as it travels through the fθ lens tends to be distorted progressively to a greater extent from the center toward outer circumference thereof, and is problematic in that, even when the X-axis galvanometer scanner and the Y-axis galvanometer scanner are controlled highly accurately, the through holes formed in an outer circumferential region of the wafer are likely to be shifted from the electrodes.

It is therefore an object of the present invention to provide a method of adjusting a laser processing apparatus to process a workpiece with a pulsed laser beam accurately at positions where the pulsed laser beam is to be applied to electrodes or the like on devices on the workpiece.

In accordance with an aspect of the present invention, there is provided a method of adjusting a laser processing apparatus. The laser processing apparatus includes a chuck table having a flat surface in an XY plane as a holding surface for holding a workpiece thereon, a laser beam applying unit for applying a pulsed laser beam to the workpiece held on the chuck table, an image capturing unit for capturing an image of the workpiece held on the chuck table, an X-axis moving mechanism for moving the chuck table and the image capturing unit relatively to each other in an X-axis direction, a Y-axis moving mechanism for moving the chuck table and the image capturing unit relatively to each other in a Y-axis direction perpendicular to the X-axis direction, and a control unit having a coordinate recording section and a corrective value recording section. The laser beam applying unit includes a laser oscillator for oscillating pulsed laser, an X-axis galvanometer scanner for swinging a pulsed laser beam emitted from the laser oscillator in the X-axis direction, a Y-axis galvanometer scanner for swinging the pulsed laser beam emitted from the laser oscillator in the Y-axis direction, and an fθ lens for converging the pulsed laser beam that has been swung in the X-axis direction and the Y-axis direction onto the workpiece held on the chuck table. The method includes a holding step of holding the workpiece on the chuck table, a coordinate recording step of recording, in the coordinate recording section, X coordinates and Y coordinates of positions where the pulsed laser beam is to be applied on the workpiece held on the chuck table, a processing step of controlling the X-axis galvanometer scanner and the Y-axis galvanometer scanner on the basis of the X coordinates and the Y coordinates recorded in the coordinate recording section to apply the pulsed laser beam to the workpiece held on the chuck table, thereby processing the workpiece, a processed mark image capturing step of actuating the X-axis moving mechanism and the Y-axis moving mechanism on the basis of the X coordinates and the Y coordinates recorded in the coordinate recording section to position the image capturing unit in alignment with processed marks on the workpiece held on the chuck table and causing the image capturing unit to capture an image of the processed marks, and a corrective value recording step of detecting shifts between X coordinates and Y coordinates of the processed marks whose image has been captured in the processed mark image capturing step and the X coordinates and the Y coordinates recorded in the coordinate recording section and recording corrective values in the corrective value recording section.

Preferably, the processed mark image capturing step includes the step of positioning the image capturing unit spirally toward the outer circumference of the workpiece from the processed mark corresponding to the center of the fθ lens as a starting point.

According to the present invention, the coordinates of target positions to which the pulsed laser beam is to be applied are corrected from the coordinates recorded in the coordinate recording section on the basis of the coordinates of the processed marks actually produced on the workpiece. Consequently, the workpiece can accurately be processed with the pulsed laser beam at positions, such as electrodes of devices on the workpieces, where the pulsed laser beam is to be applied.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTON OF THE PREFERRED EMBODIMENT

Figure 1:
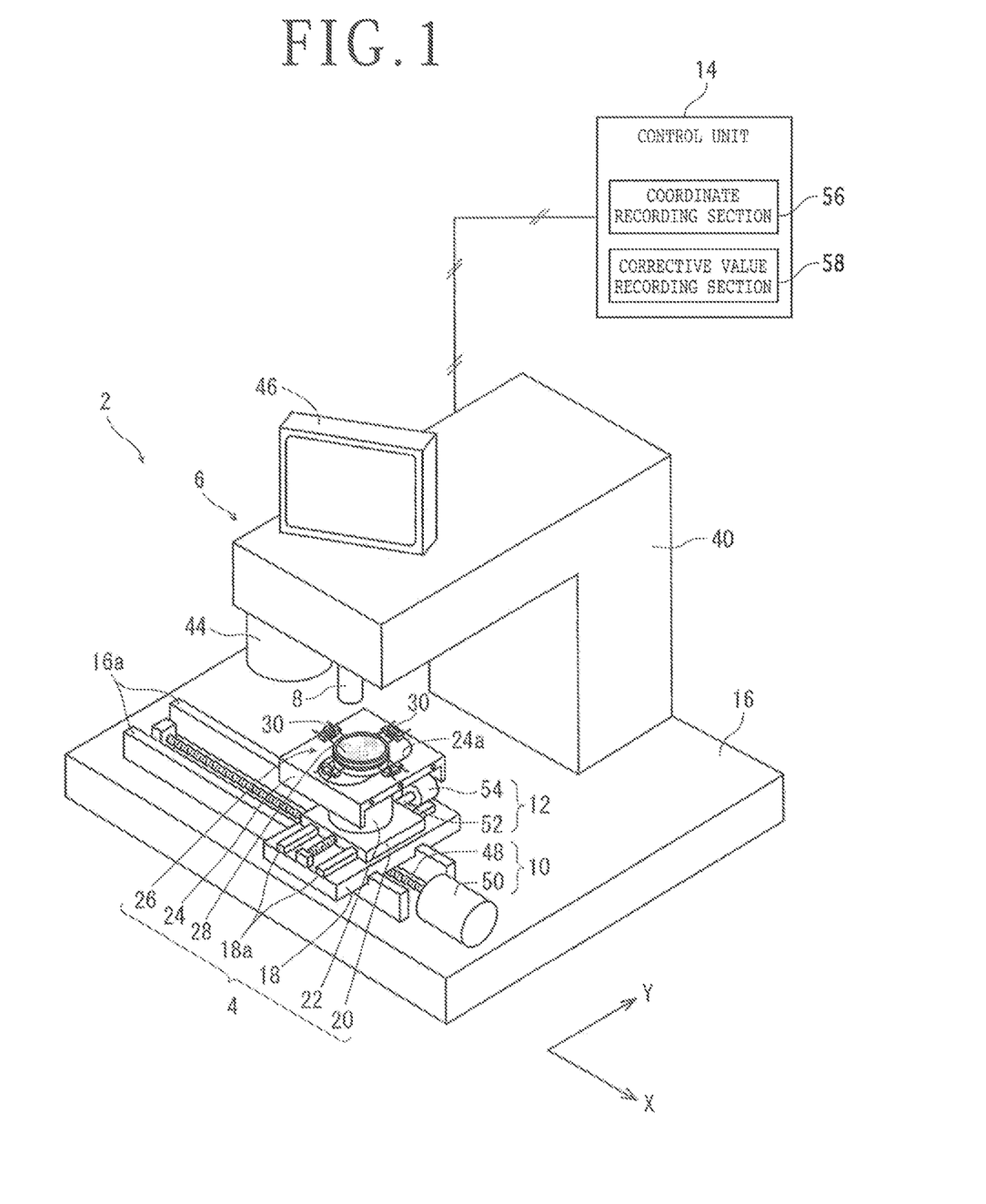
FIG. 1 is a perspective view of a laser processing apparatus to be adjusted by an adjusting method according to an embodiment of the present invention.

A method of adjusting a laser processing apparatus according to a preferred embodiment of the present invention will hereinafter be described below with reference to the accompanying drawings. The method of adjusting a laser processing apparatus will also be referred to as an adjusting method. FIG. 1 illustrates, in perspective, a laser processing apparatus to be adjusted by the adjusting method according to the present embodiment. As illustrated in FIG. 1, the laser processing apparatus, denoted by 2, includes a holding unit 4 having a flat surface in an XY plane as a holding surface for holding a workpiece, a laser beam applying unit 6 for applying a pulsed laser beam to the workpiece held on the holding unit 4, an image capturing unit 8 for capturing an image of the workpiece held on the holding unit 4, an X-axis moving mechanism 10 for moving the holding unit 4 and the image capturing unit 8 relatively to each other in an X-axis direction, a Y-axis moving mechanism 12 for moving the holding unit 4 and the image capturing unit 8 relatively to each other in a Y-axis direction, and a control unit 14 for controlling operation of the laser processing apparatus 2. The X-axis direction represent a direction indicated by an arrow X in FIG. 1 and an opposite direction thereto, and the Y-axis direction represent a direction indicated by an arrow Y in FIG. 1 and an opposite direction thereto, the Y-axis direction being perpendicular to the X-axis direction. The XY plane is defined by the X-axis direction and the Y-axis direction and lies essentially horizontally.

The holding unit 4 includes an X-axis movable plate 18 movably disposed on a base 16 for movement in the X-axis direction, a Y-axis movable plate 20 movably disposed on the X-axis movable plate 18 for movement in the Y-axis direction, a support post 22 fixedly mounted on an upper surface of the Y-axis movable plate 20, and a cover plate 24 fixed to an upper end of the support post 22. The cover plate 24 has an oblong hole 24a defined therein and longitudinally extending in the Y-axis direction. The holding unit 4 also includes a chuck table 26 rotatably disposed on the upper end of the support post 22 and extending upwardly through the oblong hole 24a. The chuck table 26 is rotatable by rotating means such as an electric motor, not illustrated, housed in the support post 22.

A circular suction chuck 28 made of a porous material and connected to suction means, not illustrated, is disposed on an upper end surface of the chuck table 26. The suction chuck 28 has an upper surface lying in the XY plane. In the chuck table 26, when the suction means is actuated, it generates suction forces acting on the upper surface of the suction chuck 28 for thereby holding the workpiece placed thereon under suction. In the holding unit 4, therefore, the upper surface of the suction chuck 28 lies in the XY plane for holding the workpiece therein. A plurality of circumferentially spaced clamps 30 are disposed around the outer circumferential edge of the chuck table 26 for clamping the workpiece on the chuck table 26.

Figure 2:
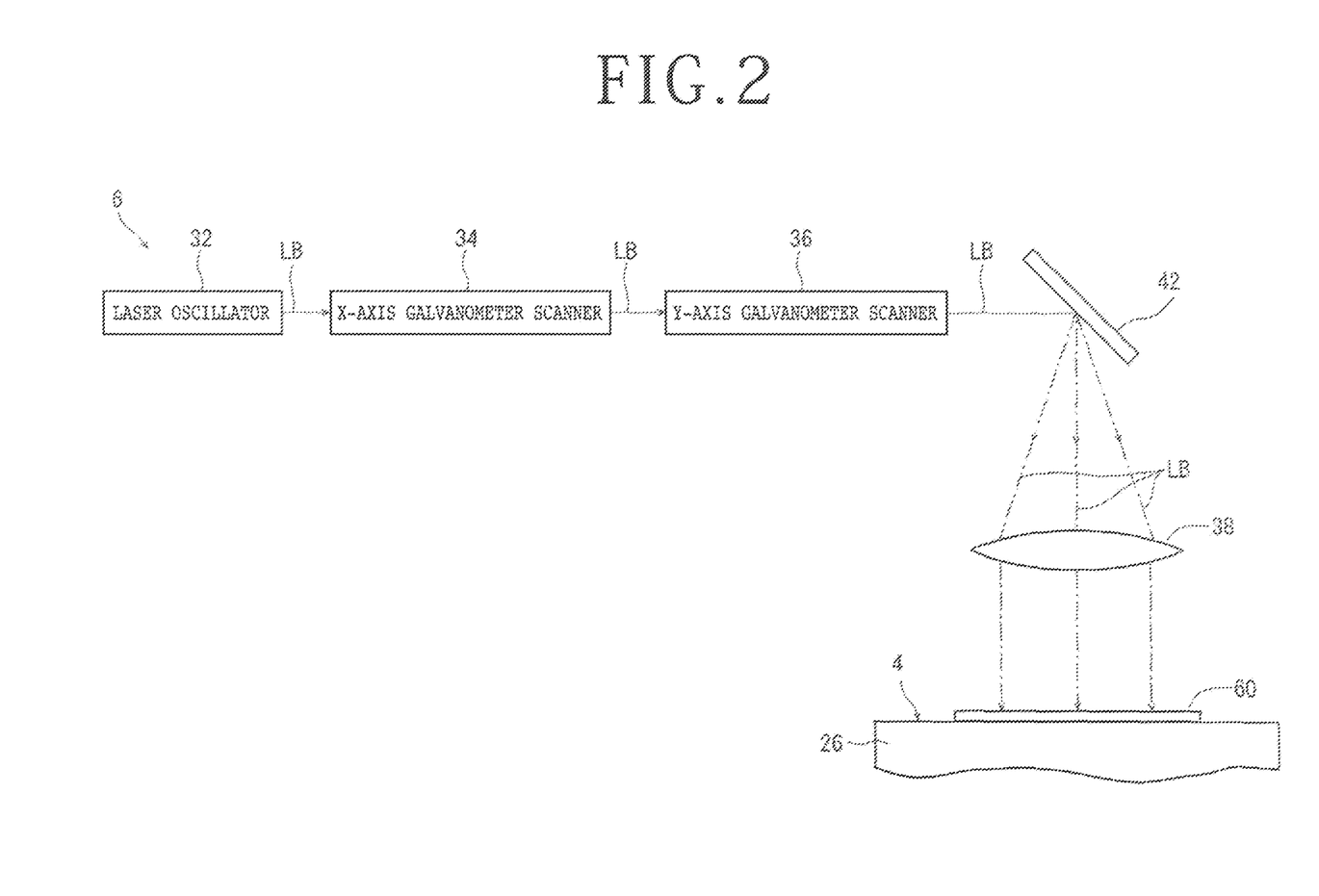
FIG. 2 is a block diagram of some components of the laser processing apparatus illustrated in FIG. 1.

As illustrated in FIG. 2, the laser beam applying unit 6 includes a laser oscillator 32 for oscillating pulsed laser, an X-axis galvanometer scanner 34 for swinging a pulsed laser beam LB emitted from the laser oscillator 32 in the X-axis direction, a Y-axis galvanometer scanner 36 for swinging the pulsed laser beam LB emitted from the laser oscillator 32 in the Y-axis direction, and an fθ lens 38 for converging the pulsed laser beam LB that has been swung in the X-axis direction and the Y-axis direction onto the workpiece held on the holding unit 4.

The X-axis galvanometer scanner 34 and the Y-axis galvanometer scanner 36 may each be of a known structure having a mirror, not illustrated, and an angle adjusting actuator, not illustrated, for adjusting the angle at which the mirror is disposed. The fθ lens 38 applies the pulsed laser beam LB that has been swung in the X-axis direction and the Y-axis direction, perpendicularly to the upper surface of the chuck table 26.

As illustrated in FIG. 1, the laser beam applying unit 6 according to the present embodiment includes a housing 40 including a vertical portion extending upwardly from an upper surface of the base 16 and a horizontal portion extending substantially and horizontally from an upper portion of the vertical portion. The housing 40 houses therein the laser oscillator 32, the X-axis galvanometer scanner 34, the Y-axis galvanometer scanner 36, and a mirror 42 (see FIG. 2) for reflecting the pulsed laser beam LB that has been swung in the X-axis direction and the Y-axis direction toward the fθ lens 38. As illustrated in FIG. 1, an fθ lens casing 44 that houses the fθ lens 38 therein is disposed on a lower surface of the distal end of the horizontal portion of the housing 40.

The pulsed laser beam LB emitted from the laser oscillator 32 of the laser beam applying unit 6 is swung in the X-axis direction and the Y-axis direction by the X-axis galvanometer scanner 34 and the Y-axis galvanometer scanner 36, reflected by the mirror 42 toward the fθ lens 38, converged by the fθ lens 38, and then dispersed and applied to a plurality of locations on the workpiece held on the holding unit 4.

As illustrated in FIG. 1, the image capturing unit 8 is mounted on the lower surface of the distal end of the horizontal portion of the housing 40 at a position spaced from the fθ lens casing 44 in one of the X-axis direction. The image capturing unit 8 includes an image capturing device such as a charge-coupled device (CCD) for capturing an image of the workpiece with a visible light beam. The image capturing unit 8 is electrically connected to a display unit 46 disposed on an upper surface of the distal end of the horizontal portion of the housing 40, so that the image captured of the workpiece by the image capturing unit 8 can be displayed on the display unit 46.

As illustrated in FIG. 1, the X-axis moving mechanism 10 includes a ball screw 48 extending in the X-axis direction along the upper surface of the base 16, and an electric motor 50 for rotating the ball screw 48 about its central axis. The ball screw 48 is operatively threaded through a nut, not illustrated, coupled to the X-axis movable plate 18. When the electric motor 50 is energized, the ball screw 48 converts the rotary motion of the electric motor 50 into linear motion and transmits the linear motion to the X-axis movable plate 18, thereby moving the X-axis movable plate 18 along guide rails 16a on the base 16 relatively to the image capturing unit 8 in the X-axis direction.

The Y-axis moving mechanism 12 includes a ball screw 52 extending in the Y-axis direction along an upper surface of the X-axis movable plate 18, and an electric motor 54 for rotating the ball screw 52 about its central axis. The ball screw 52 is operatively threaded through a nut, not illustrated, coupled to the Y-axis movable plate 20. When the electric motor 54 is energized, the ball screw 52 converts the rotary motion of the electric motor 54 into linear motion and transmits the linear motion to the Y-axis movable plate 20, thereby moving the Y-axis movable plate 20 along guide rails 18a on the X-axis movable plate 18 relatively to the image capturing unit 8 in the Y-axis direction.

The control unit 14 is constructed as a computer including a central processing unit (CPU), not illustrated, for performing arithmetic processing operations according to control programs, a read only memory (ROM), not illustrated, for storing the control programs, etc., and a read/write random access memory (RAM), not illustrated, for storing the results of the arithmetic processing operations, etc. As illustrated in FIG. 1, the random access memory implements a coordinate recording section 56 for recording the X coordinates and the Y coordinates of positions where the pulsed laser beam LB is to be applied to the workpiece held on the holding unit 4, and a corrective value recording section 58 for recording corrective values on the basis of shifts of the X coordinates and the Y coordinates of processed marks whose image has been captured by the image capturing unit 8 from the X coordinates and the Y coordinates recorded in the coordinate recording section 56.

The control unit 14 that controls overall operation of the laser processing apparatus 2 controls the laser beam applying unit 6 for dispersing and applying the pulsed laser beam LB to a plurality of locations on the workpiece held on the holding unit 4, on the basis of the X coordinates and the Y coordinates recorded in the coordinate recording section 56, for example. Further, the control unit 14 controls the X-axis moving mechanism 10 and the Y-axis moving mechanism 12 for positioning the image capturing unit 8 in alignment with processed marks on the workpiece held on the holding unit 4 to allow the image capturing unit 8 to capture an image of the processed marks, on the basis of the X coordinates and the Y coordinates recorded in the coordinate recording section 56.

Figure 3A:
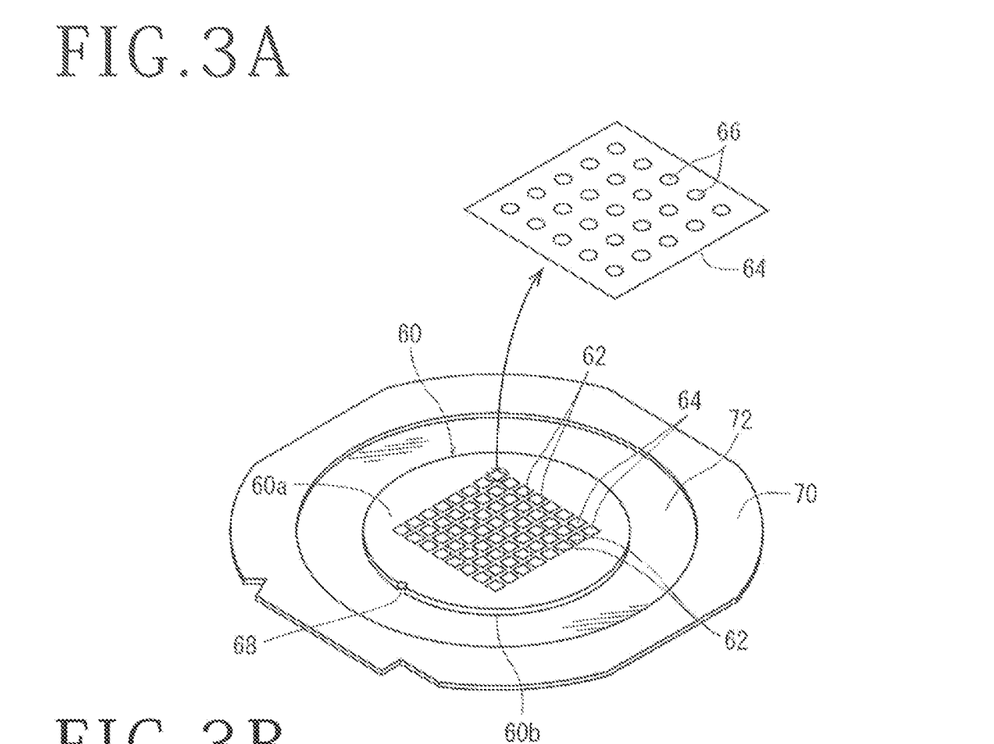
FIG. 3A is a perspective view of a wafer with devices formed thereon that is to be processed by the laser processing apparatus.

FIG. 3A illustrates, in perspective, a wafer 60 shaped as a circular plate as an example of the workpiece. The wafer 60 may be made of silicon or the like, for example. The wafer 60 has a plurality of rectangular areas on a face side 60a thereof that are demarcated by a grid of projected dicing lines 62, and a plurality of devices 64 such as ICs and LSI circuits formed in the respective rectangular areas. Each of the devices 64 has a plurality of electrodes 66. The wafer 60 has a notch (recess) 68 defined in a peripheral edge thereof as an indicator of the crystal orientation of the wafer 60. The wafer 60 according to the present embodiment has a reverse side 60b affixed to an adhesive tape 72 whose peripheral edge portion is secured to an annular frame 70.

Figure 3B:
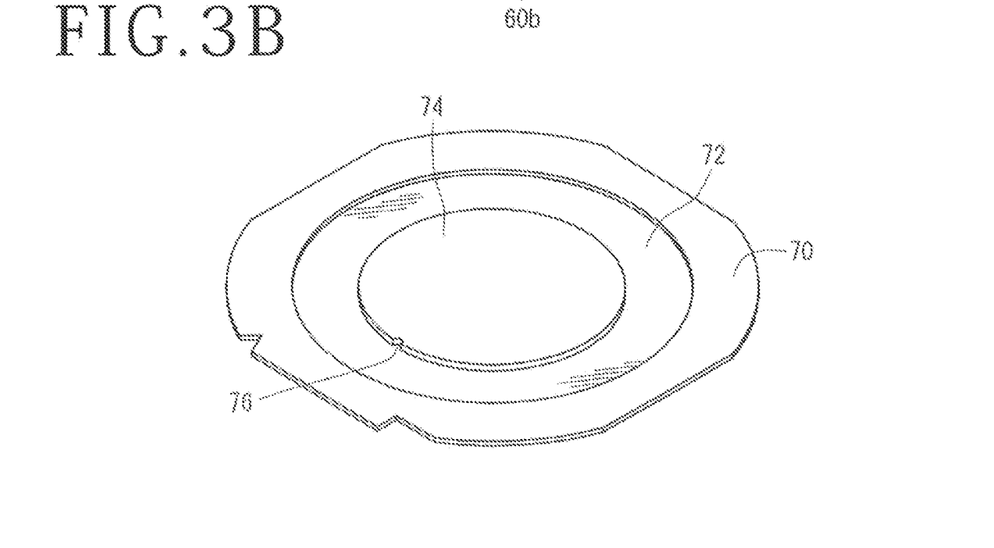
FIG. 3B is a perspective view of a dummy wafer.

FIG. 3B illustrates, in perspective, a dummy wafer 74 shaped as a circular plate as another example of the workpiece. The dummy wafer 74 that is supported on an annular frame 70 by an adhesive tape 72 is free of projected dicing lines and devices. The dummy wafer 74 has dimensions, i.e., a diameter and a thickness, identical to those of the wafer 60, and is made of a material identical to that of the wafer 60. The dummy wafer 74 according to the present embodiment has a notch (recess) 76 defined in a peripheral edge thereof as an indicator of the crystal orientation of the dummy wafer 74. The notch 76 is of the same shape as the notch 68 of the wafer 60.

The method of adjusting the laser processing apparatus 2, that is, adjusting the position where the pulsed laser beam LB is applied to the workpiece, i.e., the wafer 60, will be described below. In the adjusting method according to the present embodiment, a holding step of holding the workpiece on the holding unit 4 is carried out at first. In the holding step, the dummy wafer 74 that is supported on the annular frame 70 by the adhesive tape 72 is placed on the suction chuck 28 on the upper surface of the chuck table 26 of the holding unit 4. Then, the suction means connected to the suction chuck 28 is actuated to develop suction forces on the upper surface of the suction chuck 28, thereby holding the dummy wafer 74 under suction on the suction chuck 28. Further, the clamps 30 are turned to clamp the annular frame 70 in place.

Figure 4:
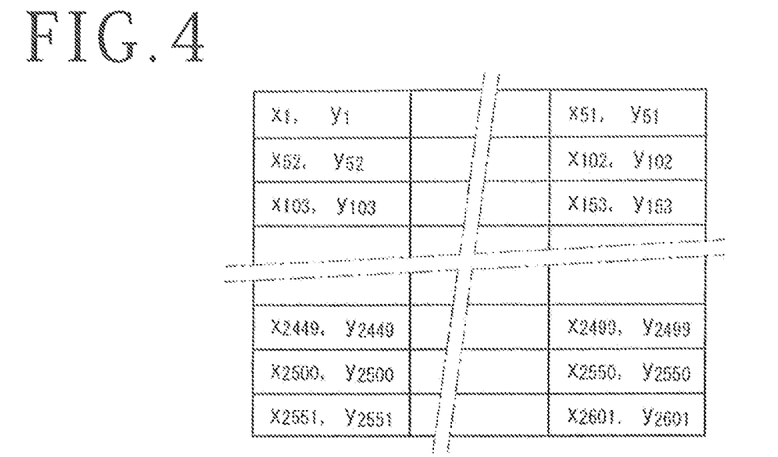
FIG. 4 is a table of X coordinates and Y coordinates recorded in a coordinate recording section of a control unit of the laser processing apparatus.

After the holding step has been carried out, a coordinate recording step is carried out to record, in the coordinate recording section 56, the X coordinates and the Y coordinates of positions where the pulsed laser beam LB is to be applied on the workpiece held on the holding unit 4. The X coordinates and the Y coordinates to be recorded in the coordinate recording section 56 in the coordinate recording step represent the X coordinates and the Y coordinates of a plurality of positions where the workpiece is to be processed by the pulsed laser beam LB, e.g., the X coordinates and the Y coordinates that indicate the positions of the electrodes 66 on the wafer 60. FIG. 4 illustrates, as an example of the X coordinates and the Y coordinates that indicate the positions of the electrodes 66, the X coordinates and the Y coordinates (Xn, Yn) of a total of 2601 (51×51) electrodes 66 that are arranged in a matrix of 51 electrodes spaced in the X-axis direction and 51 electrodes spaced in the Y-axis direction. The X coordinates and the Y coordinates to be recorded in the coordinate recording section 56 can be established in any way by using the notch 68 of the wafer 60 or the like as a reference.

After the coordinate recording step has been carried out, a processing step is carried out to control the X-axis galvanometer scanner 34 and the Y-axis galvanometer scanner 36 on the basis of the X coordinates and the Y coordinates recorded in the coordinate recording section 56 to apply the pulsed laser beam LB to the workpiece held on the holding unit 4, thereby processing the workpiece.

In the processing step, the X-axis moving mechanism 10 and the Y-axis moving mechanism 12 move the chuck table 26 to position the dummy wafer 74 held on the holding unit 4 below the fθ lens casing 44, and the electric motor for the chuck table 26 rotates the chuck table 26 to adjust the orientation of the dummy wafer 74 to a predetermined orientation. The coordinates of target positions to which the pulsed laser beam LB is to be applied are set to the X coordinates and the Y coordinates recorded in the coordinate recording section 56, and then, the pulsed laser beam LB is dispersed and applied to the dummy wafer 74 to process a plurality of locations on the dummy wafer 74 that are spaced in the X-axis direction and the Y-axis direction, leaving processed marks on the locations. In the processing step according to the present embodiment, a total of 2601 (51× 51) processed marks are formed on the dummy wafer 74 on the basis of the X coordinates and the Y coordinates (Xn, Yn) that indicate the positions of the electrodes 66.

After the processing step has been carried out, a processed mark image capturing step is carried out to actuate the X-axis moving mechanism 10 and the Y-axis moving mechanism 12 on the basis of the X coordinates and the Y coordinates recorded in the coordinate recording section 56 to position the image capturing unit 8 in alignment with the processed marks on the workpiece held on the holding unit 4 and to cause the image capturing unit 8 to capture an image of the processed marks.

Figure 5:
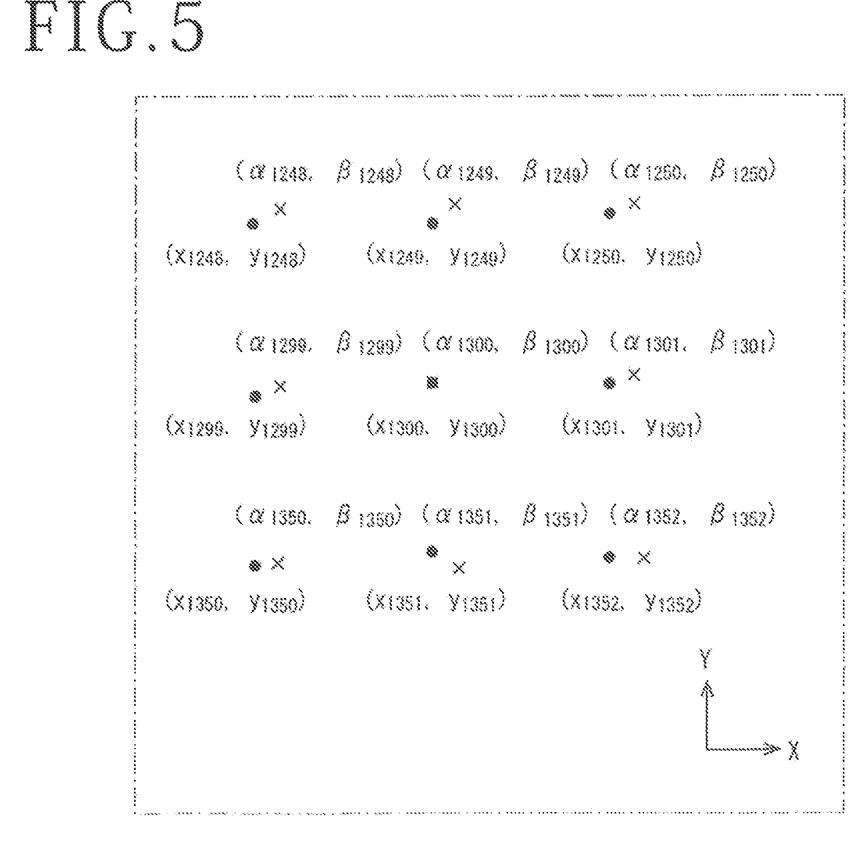
FIG. 5 is a schematic diagram of some of X coordinates and Y coordinates of a plurality of processed marks whose images are captured by an image capturing unit in a processed mark image capturing step and some of the X coordinates and the Y coordinates recorded in the coordinate recording section.

FIG. 5 schematically illustrates some of the X coordinates and the Y coordinates of a plurality of processed marks whose images are captured by the image capturing unit 8. Specifically, the locations indicated by a symbol x in FIG. 5 represent the positions of processed marks formed on the dummy wafer 74 by the pulsed laser beam LB applied after the coordinates of the target positions to which the pulsed laser beam LB is to be applied have been set to the X coordinates and the Y coordinates (Xn, Yn) recorded in the coordinate recording section 56. Moreover, in FIG. 5, the locations indicated by the symbol x are accompanied by X coordinates and Y coordinates ($\alpha n$, $\beta n$), and the locations represented by some of the X coordinates and the Y coordinates recorded in the coordinate recording section 56 are indicated by a symbol ● and accompanied by X coordinates and Y coordinates (Xn, Yn).

In the processed mark image capturing step, it is preferable to position the image capturing unit 8 spirally toward the outer circumference of the dummy wafer 74 from the processed mark ($\alpha_{1300}$, $\beta_{1300}$) corresponding to the center of the fθ lens 38 as a starting point. In this manner, the image capturing unit 8 can capture each processed mark reliably even in case the field of vision of the image capturing unit 8 is smaller than the shifts between the coordinates ($\alpha n$, $\beta n$) of the processed marks and the coordinates (Xn, Yn) recorded in the coordinate recording section 56. In the example illustrated in FIG. 5, the coordinates ($\alpha_{1300}$, $\beta_{1300}$) of the processed mark corresponding to the center of the fθ lens 38 agree with the coordinates ($X_{1300}$, $Y_{1300}$) recorded in the coordinate recording section 56, whereas the coordinates of the processed marks other than the coordinates ($\alpha_{1300}$, $\beta_{1300}$) are shifted from the coordinates recorded in the coordinate recording section 56, i.e., the coordinates of target positions to which the pulsed laser beam LB is to be applied.

After the processed mark image capturing step has been carried out, a corrective value recording step is carried out to detect shifts between the X and Y coordinates ($\alpha n$, $\beta n$) of the processed marks whose image has been captured in the processed mark image capturing step and the X and Y coordinates (Xn, Yn) recorded in the coordinate recording section 56 of the control unit 14, and to record corrective values in the corrective value recording section 58.

Figure 6:
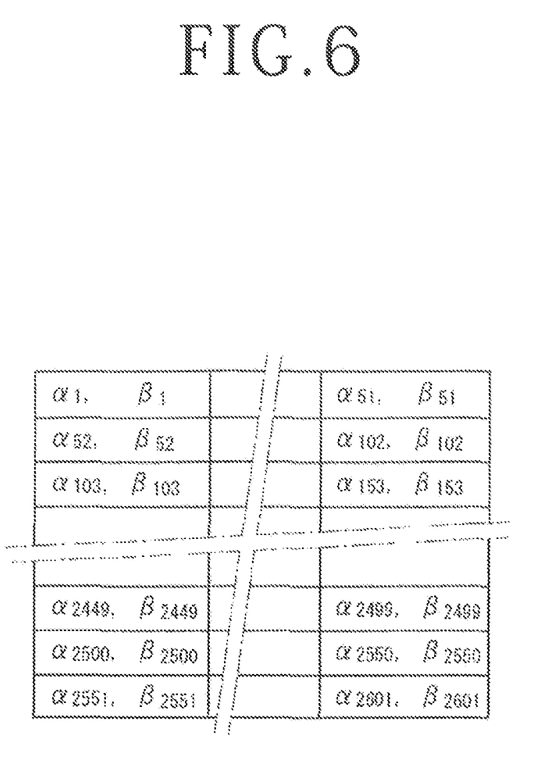
FIG. 6 is a table of X coordinates and Y coordinates of processed marks recorded in a corrective value recording section of the control unit.

In the corrective value recording step, the coordinates ($\alpha n$, $\beta n$) of the processed marks are determined from the image of the processed marks whose image has been captured in the processed mark image capturing step (see FIG. 6). Then, shifts, i.e., shifts in the X-axis direction and the Y-axis direction, between the coordinates ($\alpha n$, $\beta n$) of the processed marks and the coordinates (Xn, Yn) recorded in the coordinate recording section 56 are detected. Then, corrective values for correcting the coordinates of the target positions to which the pulsed laser beam LB is to be applied from the coordinates (Xn, Yn) recorded in the coordinate recording section 56 are calculated on the basis of the detected shifts. The calculated corrective values are recorded in the corrective value recording section 58 of the control unit 14. Further, the coordinates of the target positions to which the pulsed laser beam LB is to be applied are corrected from the coordinates (Xn, Yn) recorded in the coordinate recording section 56, by using the calculated corrective values, and the corrected coordinates of the target positions to which the pulsed laser beam LB is to be applied are recorded in the corrective value recording section 58.

In the corrective value recording step, in order to deal with various processing conditions, the corrective values referred to above may be replaced with a function, and such a function may be recorded in the corrective value recording section 58, and then, by using the function replaced from the corrective values, the coordinates of the target positions to which the pulsed laser beam LB is to be applied may be corrected from the coordinates (Xn, Yn) recorded in the coordinate recording section 56. Further, a region to which the pulsed laser beam LB can be applied in the laser processing apparatus 2 by the X-axis galvanometer scanner 34 and the Y-axis galvanometer scanner 36 as they operate may be divided into a plurality of regions, and a function for correcting the coordinates of the target positions to which the pulsed laser beam LB is to be applied from the coordinates (Xn, Yn) recorded in the coordinate recording section 56 may be calculated with respect to each of the divided regions. When each of the regions is to be processed by the pulsed laser beam LB, the coordinates of the target positions to which the pulsed laser beam LB is to be applied may be corrected from the coordinates (Xn, Yn) recorded in the coordinate recording section 56 according to the function calculated with respect to the region.

After the corrective value recording step has been carried out, the suction means connected to the suction chuck 28 of the holding unit 4 is inactivated to release the dummy wafer 74 from the suction chuck 28, and the clamps 30 are turned back to unclamp the annular frame 70. Then, the dummy wafer 74 used as the workpiece for calculating the corrective values is removed from the holding unit 4. Thereafter, the wafer 60 as a workpiece to be processed with the pulsed laser beam LB, i.e., a workpiece where through holes are to be formed in the respective electrodes 66 according to the present embodiment, is held under suction on the holding unit 4. The X-axis galvanometer scanner 34 and the Y-axis galvanometer scanner 36 are controlled to disperse and apply the pulsed laser beam LB to the wafer 60 on the basis of the corrected coordinates of the target positions to which the pulsed laser beam LB is to be applied, forming through holes in the electrodes 66 on the wafer 60.

In the method of adjusting the laser processing apparatus 2 according to the present embodiment, as described above, the coordinates of the target positions to which the pulsed laser beam LB is to be applied are corrected from the coordinates (Xn, Yn) recorded in the coordinate recording section 56 on the basis of the X and Y coordinates ($\alpha n$, $\beta n$) of the processed marks actually produced on the dummy wafer 74. Consequently, the pulsed laser beam LB can be applied to the electrodes 66 of the devices 64 on the wafer 60 to form through holes accurately in the respective electrodes 66.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A method of adjusting a laser processing apparatus for applying a pulsed laser beam onto a workpiece having a plurality of devices, the laser processing apparatus including
a chuck table having a flat surface in an XY plane as a holding surface for holding the workpiece thereon,
a laser beam applying unit for applying the pulsed laser beam to the workpiece held on the chuck table,
an image capturing unit for capturing an image of the workpiece held on the chuck table,
an X-axis moving mechanism for moving the chuck table and the image capturing unit relatively to each other in an X-axis direction,
a Y-axis moving mechanism for moving the chuck table and the image capturing unit relatively to each other in a Y-axis direction perpendicular to the X-axis direction, and
a control unit having a coordinate recording section and a corrective value recording section,
the laser beam applying unit including
a laser oscillator for oscillating pulsed laser,
an X-axis galvanometer scanner for swinging a pulsed laser beam emitted from the laser oscillator in the X-axis direction,
a Y-axis galvanometer scanner for swinging the pulsed laser beam emitted from the laser oscillator in the Y-axis direction, and
an fθ lens for converging the pulsed laser beam that has been swung in the X-axis direction and the Y-axis direction onto the workpiece held on the chuck table,
the method comprising:
a holding step of holding a workpiece devoid of devices on the chuck table;
a coordinate recording step of recording, in the coordinate recording section of the control unit, X coordinates and Y coordinates of positions where the pulsed laser beam is to be applied on the workpiece having the plurality of devices;
a processing step of controlling the X-axis galvanometer scanner and the Y-axis galvanometer scanner on a basis of the X coordinates and the Y coordinates recorded in the coordinate recording section to apply the pulsed laser beam to the workpiece devoid of devices held on the chuck table, thereby processing the workpiece to create processed marks;
a processed mark image capturing step of actuating the X-axis moving mechanism and the Y-axis moving mechanism on the basis of the X coordinates and the Y coordinates recorded in the coordinate recording section of the control unit to position the image capturing unit in alignment with the processed marks on the workpiece devoid of devices held on the chuck table and causing the image capturing unit to capture an image of the processed marks; and
a corrective value recording step of detecting shifts between X coordinates and Y coordinates of the processed marks whose image has been captured in the processed mark image capturing step and the X coordinates and the Y coordinates recorded in the coordinate recording section of the control unit, calculating corrective values based on the detected shifts, replacing the corrective values with a function, and recording the function in the corrective value recording section.

2. The method of adjusting a laser processing apparatus according to claim 1, wherein
the processed mark image capturing step includes a step of positioning the image capturing unit spirally toward an outer circumference of the workpiece devoid of devices from a processed mark corresponding to a center of the fθ lens as a starting point.

3. The method of adjusting a laser processing apparatus according to claim 1, further comprising:
replacing the workpiece devoid of devices with the workpiece having a plurality of devices on the chuck table and applying the pulsed laser beam to the workpiece having a plurality of devices based on the function recorded in the corrective value recording section.

4. The method of adjusting a laser processing apparatus according to claim 1, wherein the workpiece devoid of devices is made of a material identical to that of the workpiece having the plurality of devices, and has a first side directly attached to a first side of an adhesive tape which has a second side in direct contact with the chuck table.

* * * * *